F. W. KREMER.
AUTO TIRE BEAD WRAPPING MACHINE.
APPLICATION FILED MAY 22, 1913.
1,132,359.
Patented Mar. 16, 1915.
2 SHEETS—SHEET 1.
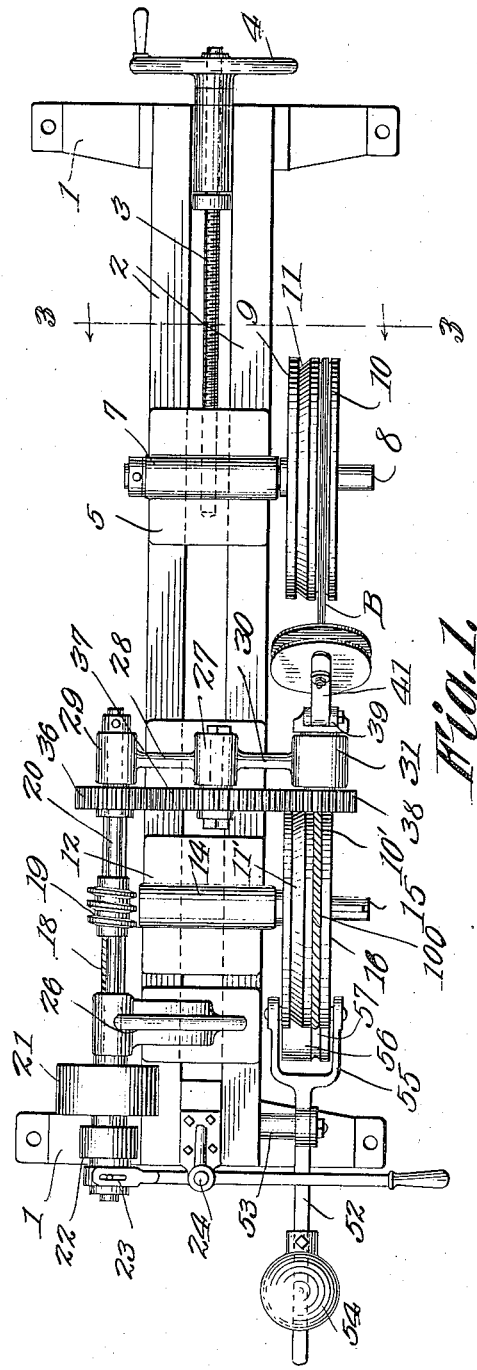
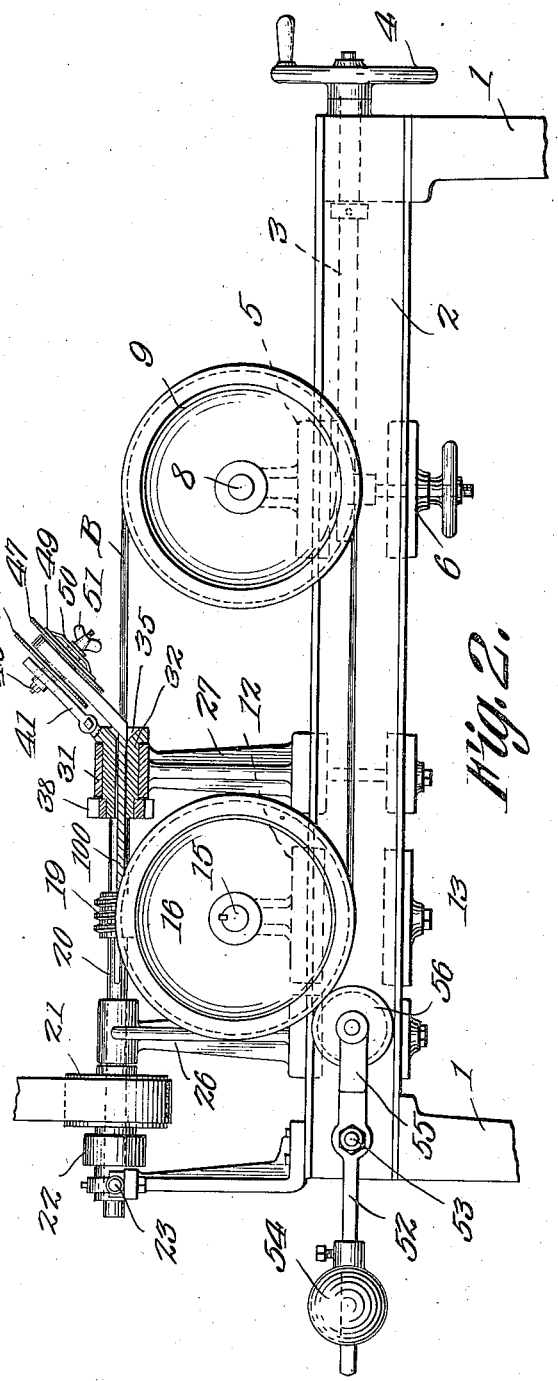
Witnesses
F. W. Kremer, Inventor,
by C. A. Snow & Co.
Attorneys.

F. W. KREMER.
AUTO TIRE BEAD WRAPPING MACHINE.
APPLICATION FILED MAY 22, 1913.
1,132,359.
Patented Mar. 16, 1915.
2 SHEETS—SHEET 2.
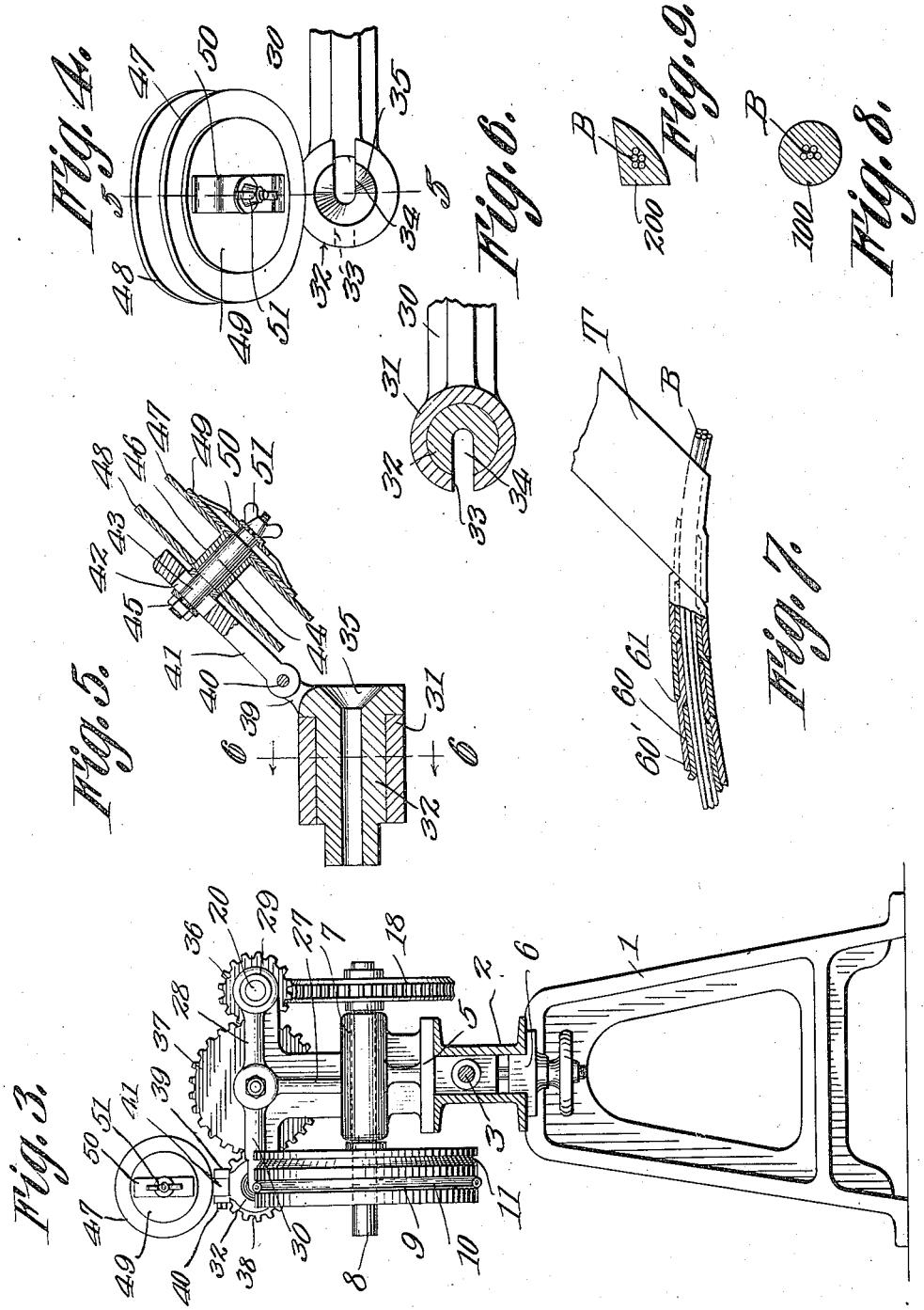
F. W. Kremer Inventor,
by C. A. Snow & Co.
Attorneys.

UNITED STATES PATENT OFFICE.

FRANKLIN W. KREMER, OF CARLSTADT, NEW JERSEY.

AUTO TIRE-BEAD-WRAPPING MACHINE.

1,132,359.  Specification of Letters Patent.  Patented Mar. 16, 1915.

Application filed May 22, 1913. Serial No. 769,282.

*To all whom it may concern:*

Be it known that I, FRANKLIN W. KREMER, a citizen of the United States, residing at Carlstadt, in the county of Bergen and State of New Jersey, have invented a new and useful Auto Tire-Bead-Wrapping Machine, of which the following is a specification.

The present invention relates to improvements in auto tire bead wrapping machines, the primary object of the present invention being the provision of a machine in which a bead preferably composed of a single strand of wire wound to form a plurality of convolutions, preferably piano wire, is placed upon a bead feeding and forming mechanism, is forcibly stretched to place the same pressure or tension upon each convolution and has wrapped thereupon the adhesive tape, so that two overlapped layers of this tape are disposed thereupon spirally, the initial layer having its adhesive compressed into the interstices between the convolutions so as to form with the convolutions of wire and the tape a homogeneous bead for introduction into the rim of a tire.

A further object of the present invention is the provision of an auxiliary means whereby the wrapped bead has imparted thereto the desired shape, and whereby the metal convolutions thereof are disposed and retained in proper relation to the wrapper at all times.

A still further object of this invention is the provision of a bead wrapping machine in which the convolutions of wire constituting the bead are so disposed that each convolution will have the same strain thrown thereupon, so that all convolutions combine to produce a non-stretchable durable bead without a kinked portion in the strand.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view of the complete machine. Fig. 2 is a side elevation thereof, a section being taken through the spindle of the tape carrying and wrapping device. Fig. 3 is a cross section taken on line 3—3 of Fig. 1. Fig. 4 is a perspective view of wrapping device. Fig. 5 is a section taken on line 5—5 of Fig. 4. Fig. 6 is a section taken on line 6—6 of Fig. 5. Fig. 7 is an enlarged detail view partly in section of one of the beads showing the relative position of the tape thereupon. Figs. 8 and 9 are detail views of two beads formed with the present machine.

Referring to the drawings, the numeral 1 designates the standards which carry the supporting or bed plate 2, which as shown is preferably composed of two parallel channel irons and has mounted therebetween at one end the feed screw 3 controlled by the hand wheel 4, the inner end of said feed screw 3 being operably connected to the sliding plate 5 which is held against longitudinal movement when in the desired adjustment by means of the manually controlled clamp 6. This plate 5 carries the transversely disposed journal box 7 in which is rotatably mounted the shaft 8 of the adjustable bead forming and feeding wheel 9. The periphery of this wheel, as clearly shown is provided with the semi-circular groove 10 and the triangular groove 11, the semi-circular groove 10 being employed when the bead 100, as clearly shown in Fig. 8 is formed while the triangular groove 11 is employed when the bead 200, as shown in Fig. 9, is formed.

Secured to the bed plate at the end remote from the hand wheel 4 is the plate 12 which is clamped in place by the clamp 13 and carries the transversely disposed journal box 14, said journal box being in the same horizontal plane as the journal box 7. Journaled in the journal box 14 is the shaft 15, which carries upon the end at the same side of the bed plate 2 as the forming wheel 9, a similar shaped forming wheel 16 which is provided with the corresponding grooves 10' and 11' respectively, said grooves being in vertical alinement as clearly illustrated. Upon the opposite end of the shaft 15 to the forming wheel 16 is a large gear 18, which is in mesh with the small worm gear 19 mounted upon the longitudinally disposed shaft 20, said shaft 20 being operably connected through the clutch 22 to the power transmitting pulley 21, said clutch 22 being controlled through the clutch lever 23 journaled intermediate of its ends, as at 24. The shaft 20 as clearly illustrated, is journaled in the upper end of the bracket 26 and in the sleeve 29 carried by the arm 28 of the bracket 27, thus maintaining the shaft in the desired relative position at all times. Another arm 30 is carried by the standard 27 and extends in an opposite direction to the arm 28 and carries the journal box or sleeve 31, in which is rotatably mounted the spindle or hollow sleeve 32, said sleeve 31 being provided with the slot or throat 33 which is disposed to have placed in alinement therewith, the slot or throat 34 of the spindle 32 when it is desired to insert the convoluted strand forming the core or bead B therein.

The spindle 32 is driven from the shaft 20 through the gears 36, 37 and 38, as clearly illustrated in Figs. 1 and 3, and thus said spindle is permitted to rotate about the bead B when the same is in the position as clearly shown in Figs. 1, 2 and 3. The outer mouth of the bore of the spindle or sleeve 32 is tapered as at 35 so as to permit of the desired angularity of the tape T as the same is wound upon the bead B to produce the structure as clearly shown in Fig. 7.

An angularly disposed lug 39 is carried by the spindle or sleeve 32 and has connected thereto by means of the clamp 40, the tape reel carrying arm 41, said arm being slotted as at 42 adjacent the free end thereof for the adjustable fitting therewithin and securing thereto of the spindle or shaft 43. This shaft 43 is provided with the enlarged diametered portion 44 and by means of a nut 45 is clamped in the desired adjusted position within the slot 42 of the arm 41. A sleeve 46, with its integral flange 47 and detachable flange 48, constitutes the tape carrying spool or reel of the device, the disk or ring 48 being detachable to permit of the introduction of the tape reel thereupon. In order to hold the tape at the desired tension during the rotation of the spindle 32 and consequently the carrying of the arm 41 and the reel about the bead B, a disk 49, preferably of hard paper fiber, is attached to the outer disk 47 of the reel and has adjustably engaging the same, the spring terminal brake member 50, which is held at the desired tension by means of the winged nut 51 detachably secured to the outer free end of the shaft 43.

It will thus be seen that the rotation of the shaft 20 through the clutch 22 and power transmission pulley 21 will simultaneously rotate the shaft 15 and the bead feeding and forming wheel 16, and through the gears 36, 37 and 38 the spindle 32 of the tape wrapping or feeding device, the bead B when in the proper position and placed to surround the respective forming wheels 9 and 16 constituting a power transmission means between the said forming wheels so that the forming wheel 9 will be rotated simultaneously with the wheel 16.

In order that the bead may be properly shaped after the same has received the wrapper thereupon, an auxiliary forming means is provided, the same comprising the pivoted arm 52, which is carried by the pin or bracket 53 and having adjustably mounted upon its free end, the weight 54, which normally holds the yoke end 55 in elevated position so that the forming disk or wheel 56 is held in close engagement with the periphery of the forming wheel 16. This disk or wheel 56 is provided with the semicircular groove 57, which is disposed to aline with the groove 10' and thus assist in packing or forming the wrapped bead in combination with the forming groove 10' of the wheel 16. When the bead is disposed within the groove 11', the flat surface of the disk wheel 56 engages the outer surface of the bead and assists in packing the same within the triangular shaped groove 9' so as to form a bead as clearly shown in Fig. 9.

In producing the desired bead upon the present machine, a single strand of piano wire, or any wire that will be comparatively non-stretchable, is formed into a plurality of loops or convolutions and the respective ends thereof are so spliced together as to produce a ring, each convolution of which is disposed in parallel and in no way twisted or braided, the same preferably assuming the positions as clearly shown in Figs. 7, 8 and 9 and when properly wrapped to be in substantially the center portion of the tape T so that the parallel convolutions will be properly protected by the tape and be held in such position at all times. The thus formed ring is placed upon the forming wheel 16 and also about the forming wheel 9, the convolutions being disposed in their respective grooves 10—10' or 11—11'. The clamp 6 having been released, the hand wheel 4 is manipulated to move the wheel 9 so that each convolution is forcibly given the desired tautness and all kinks or bends are removed, at which time the clamp 6 is operated to maintain the wheel 9 in the desired adjusted position. The end of the tape T is now placed upon the bead adjacent to the flared mouth 35 of the spindle 32, and the clutch lever 23 is operated so that power is transmitted to the shaft 20 and the two feeding and forming wheels 16 and 9 and the spindle 32 are rotated consonantly. The tape T employed for this purpose, is preferably of a character in which the fabric is saturated with and also carries upon the respective faces thereof, a layer of sticky rubber, such outer layer being of sufficient thickness, to, when the tape is wound upon the bead B, cause the inner layer 60 to have the adhesive material or layer adjacent to the bead forced in between the various strands of wire to fill the interstices thereof and thus to a great extent assist in binding the same homogeneously. The inner layer 60 is so formed that when the outer layer as 60' is wound thereupon, a shoulder 61 will be provided so that as the tape T is wound spirally upon the bead B, two layers of tape will be disposed about the bead, all as clearly illustrated in Fig. 7.

The grooves 10 of the forming wheel 9 tend to retain the bead B, before the wrapping of the tape thereupon, in the desired shape, but as the tape is wound about the bead during its passage from the reel 9 upon the reel 16, said casing being formed evenly upon the bead throughout its length and circumference, the same will enter the groove 10', of the forming wheel 16 and will thus assume the shape of such bead upon the face adjacent to the wheel 16. In order, however, to form the outer face of the wrapped bead, the groove 57 of the weight actuated auxiliary forming wheel 56 engages the bead 100 within the groove 10' of the wheel 16, and thus compresses the same and completes the formation of the bead so that the finished bead will assume the contour, as shown in Fig. 8.

Should the bead B be placed in the respective grooves 11—11' and the tape be wrapped thereupon similarly to the wrapping as shown in Fig. 7, the smooth surface of the auxiliary forming disk 56 will coact with the triangular groove 11' of the forming wheel 16 and produce a bead, as clearly shown in Fig. 9. The bead thus formed after the tape has been wound upon the same the full length thereof, is removed by releasing the clamp 6 and operating the feed screw 3 through the hand wheel 4 so as to move the wheel 9 toward the forming wheel 16, the finished bead being removed through the throats 34 and 33 of the spindle 32 and support 31 and from the circumferential grooves of the respective forming wheels 9 and 16. The bead is then in condition to be disposed within the unvulcanized portion of the tire to reinforce the same, the same being vulcanized therewithin and producing a bead, the strands of which remain in parallel and are of such a length as to combinedly receive the full strain thrown upon the bead, and as the same is composed of a non-stretchable wire, such as for instance, piano wire, it is evident that a bead constructed according to the present invention by this machine will be more durable than a plaited or twisted bead.

What is claimed is:

1. An auto tire bead forming and wrapping machine, including a frame, two spacedly mounted wheels, the periphery of each of which is provided with a shaping bead receiving groove, said wheels being designed to receive therearound a bead composed of a single strand formed into a plurality of convolutions, said bead constituting a power transmitting means between the wheels, means for adjusting one of the wheels relatively to the other to accommodate the bead and to forcibly place the convolutions of such bead under an equal strain or tension, and a tape applying device interposed between the wheels for applying the tape about the convolutions of the bead while the bead is under tension.

2. An auto tire bead forming and wrapping machine, including a frame, two spacedly mounted wheels, the periphery of each of which is provided with a shaping bead receiving groove, said wheels being designed to receive therearound a bead composed of a single strand formed into a plurality of convolutions, said bead constituting a power transmitting means between the wheels, means for adjusting one of the wheels relatively to the other to accommodate the bead and to forcibly place the convolutions of such bead under an equal strain or tension, a tape applying device interposed between the wheels for applying the tape about the convolutions of the bead while the bead is under tension, and an auxiliary bead forming means disposed in proper relation with one of the shaping grooves for shaping the wrapped bead.

3. An auto tire bead wrapping machine, including a frame, two spacedly mounted wheels, the periphery of each of which is provided with a bead shaping and receiving groove, a rotary tape carrying device mounted between the wheels for operating upon a bead while it is upon the wheels, means disposed in coöperable relation with such device for guiding a bead from one wheel to the other when receiving the tape, means for synchronously operating one of the wheels and the tape carrying device, and an auxiliary forming means disposed in coöperable relation with one of the bead receiving grooves for shaping the wrapped bead.

4. An auto tire bead wrapping machine, including a frame, two spacedly mounted wheels, the periphery of each of which is provided with a bead shaping and receiving groove to receive an endless bead which acts as a driving means between the wheels, one of said wheels being adjustable relatively to the other, a rotary tape carrying device mounted between the wheels in the path of the bead when it is upon the wheels, means disposed in coöperable relation with such device for guiding the bead from one wheel to the other when receiving the tape thereupon, means for synchronously operating the wheels and tape carrying device, and an auxiliary forming means disposed in coöperable relation with one of the bead receiving grooves for shaping the wrapped bead.

5. An auto tire bead forming and wrapping machine, including a frame, two spacedly mounted wheels, the periphery of each of which is provided with a bead shaping and receiving groove, said wheels being designed to receive therearound a bead composed of a single strand formed into a plurality of convolutions, said bead constituting a power transmitting means between said wheels, means for adjusting one of the wheels relatively to the other to accommodate the bead and to forcibly place the convolutions of such bead under an equal strain or tension, a tape applying device interposed between the wheels for applying the tape about the convolutions of the bead while the bead is under tension, an auxiliary bead forming means disposed in proper relation to one of the shaping grooves for shaping the wrapped bead, and an adjusting means for regulating the pressure of the auxiliary forming means.

6. An auto tire bead wrapping machine, including a frame, two spacedly mounted wheels, the periphery of each of which is provided with a bead shaping and receiving groove, a rotary tape carrying device, means disposed in coöperable relation therewith for guiding the bead from one wheel to the other when receiving the tape, means for synchronously operating the wheels and the tape carrying device, an auxiliary forming means disposed in coöperable relation with one of the bead receiving grooves for shaping the wrapped bead, and an adjusting means for regulating the pressure of the auxiliary forming means.

In testimony that I claim the foregoing as my own, I have hereto affixed my signature in the presence of two witnesses.

FRANKLIN W. KREMER.

Witnesses:
J. A. MILLER,
SPENCER WELTON.